Oct. 16, 1962
A. VANG
3,059,094
PRESSURE TRANSFORMER
Filed Sept. 23, 1960
2 Sheets-Sheet 1
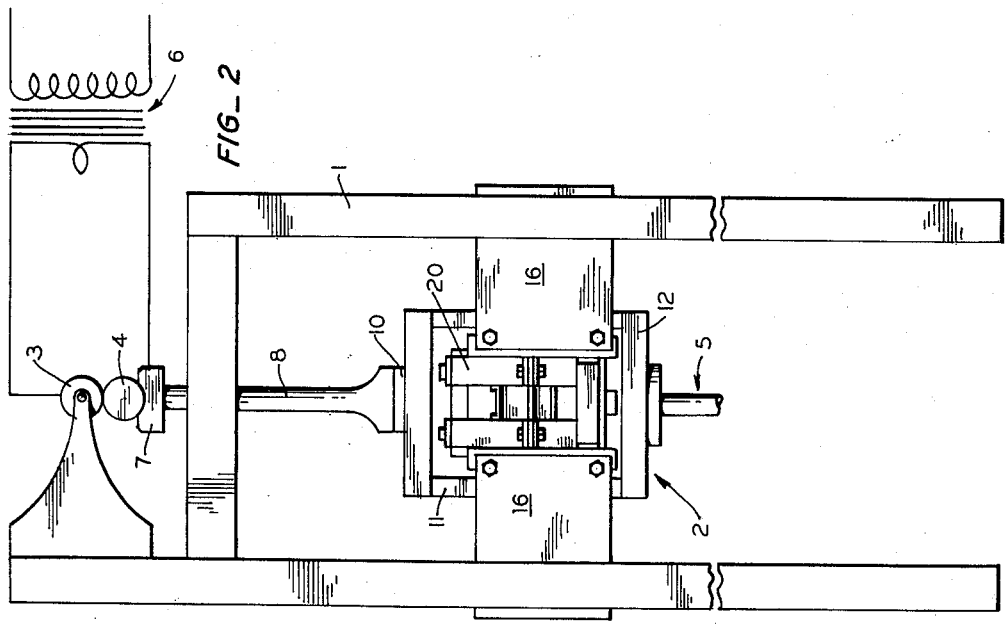
FIG_2
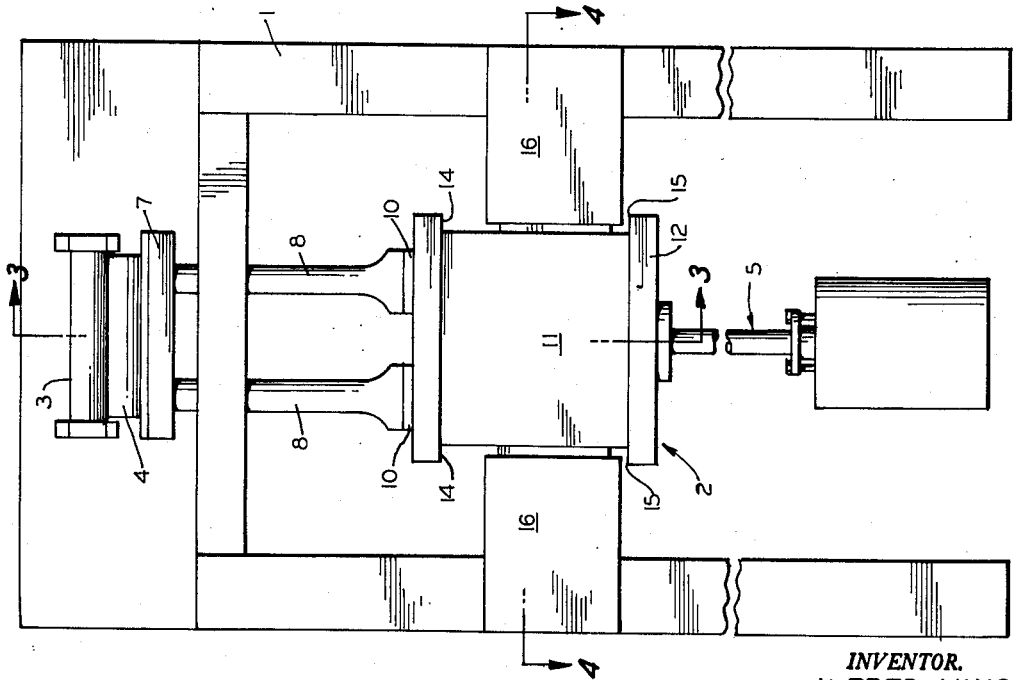
FIG_1
INVENTOR.
ALFRED VANG
BY Hoppe and Mitchell
ATTORNEYS Oct. 16, 1962  A. VANG  3,059,094
PRESSURE TRANSFORMER
Filed Sept. 23, 1960  2 Sheets-Sheet 2
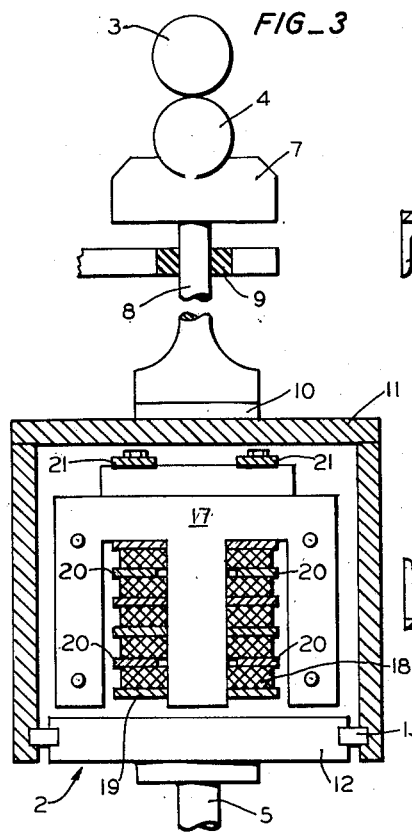
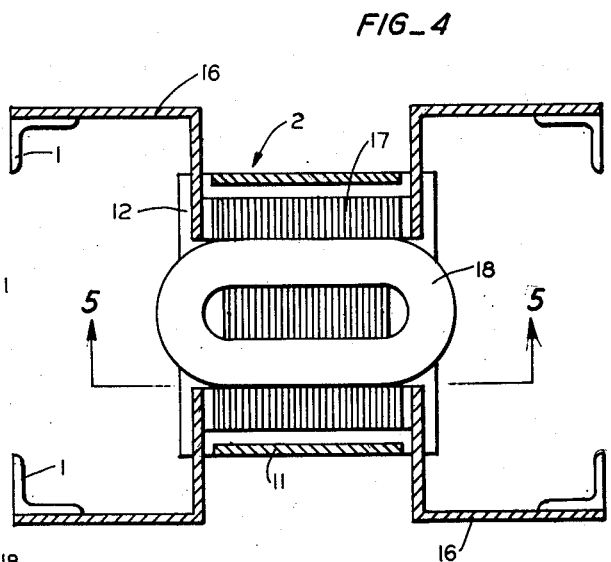
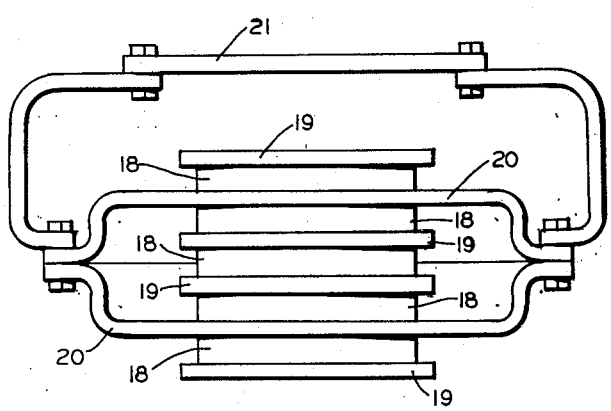
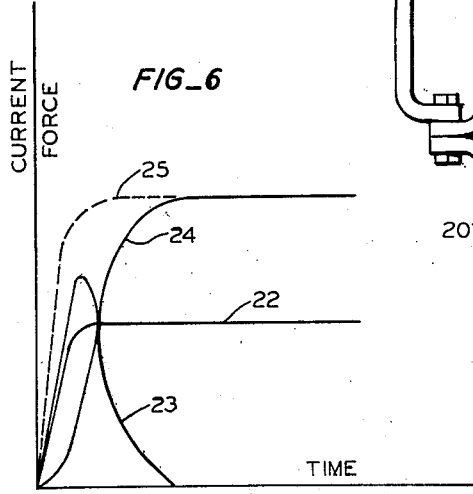
INVENTOR.
ALFRED VANG
BY Hoppe and Mitchell
ATTORNEYS

United States Patent Office 3,059,094
Patented Oct. 16, 1962

3,059,094
PRESSURE TRANSFORMER
Alfred Vang, Rancho Santa Fe, Calif., assignor of one-third to Anna Vang and one-third to Alfred Vang, trustee
Filed Sept. 23, 1960, Ser. No. 58,003
6 Claims. (Cl. 219—86)

This invention relates generally to pressure transformers and more particularly to an improved transformer for developing a maximum output pressure simultaneously with a command signal. The present invention is particularly useful for developing welding electrode forging pressures in timed relation to the welding current in resistance welding systems.

The principal object of this invention is to provide an improved pressure transformer for developing a maximum pressure simultaneously with a command signal, as distinguished from a gradual increase up to a maximum pressure which lags the command signal.

A further object of this invention is to provide a welding apparatus having a pressure transformer which develops electrode forging pressure simultaneously with welding current applied to the electrodes.

Another object of this invention is to provide a welding apparatus having cylindrical electrodes for simultaneously effecting a linear weld, together with means for developing a uniform welding pressure over the full length of the weld.

The foregoing and other objects and advantages of this invention will become apparent to those skilled in this art upon an understanding of the preferred embodiment described herein and illustrated in the accompanying drawings, wherein:

FIG. 1 is a front elevational view of welding apparatus utilizing features of the present invention;

FIG. 2 is a side elevational view of the apparatus of FIG. 1;

FIG. 3 is an enlarged vertical sectional view of the apparatus taken along line 3—3 of FIG. 1;

FIG. 4 is a horizontal sectional view taken through the pressure transformer along line 4—4 of FIG. 1;

FIG. 5 is an enlarged side elevational view of the pressure transformer windings taken along line 5—5 of FIG. 4; and FIG. 6 is a graphical representation of the time relationship between the pressure developed by the transformer with a command signal as a reference.

Referring specifically to FIG. 1 the selected embodiment described herein includes a welding apparatus having a fixed electrode and a movable electrode. The movable electrode develops welding pressure against a work piece placed between it and the fixed electrode by means of a pressure transformer having features of the present invention. The described apparatus includes a frame 1 and a pressure transformer 2 supported on the frame. The frame also supports a fixed electrode 3, illustrated herein as a cylindrical roll. The movable electrode 4 is vertically shiftable relative to the frame and to fixed electrode 3 by the pressure transformer described more fully herein and by means of pneumatic or hydraulic jack 5. As illustrated diagrammatically in FIG. 2 electrodes 3 and 4 are connected to the secondary winding of a typical welding transformer 6.

Electrode 4 is supported upon a shoe 7 secured to a pair of pins 8. The pins are vertically slidable each within in insulated guide bushing 9 secured to the frame, as appears in FIG. 3. The pins are secured to the top of pressure transformer 2 and reciprocate with it. Insulation strips 10 electrically insulate each pin from the frame 11 of the pressure transformer.

The pressure transformer comprises an electrically conductive transformer frame 11 to which is keyed a magnetic bottom yoke 12 by key means 13. The bottom yoke is fabricated from laminated iron sheets so as to reduce eddy currents. The jack 5, which is fixed relative to frame 1, abuts yoke 12 and moves transformer frame 11 vertically to bring the attached movable electrode 4 into operating position. It will be observed in FIGS. 1 and 4 that the transformer frame 11 has upper lips 14 and lower lips 15 which support and limit vertical movement of the transformer frame relative to the adjacent portions of brackets 16 extending inwardly from the frame 1. The lower lips 15 are formed from the extended ends of the bottom yoke 12.

It has been found that the described cylindrical electrodes, supporting cradle and pressure transformer assembly can be used to develop uniform welding pressure over the full length of the resultant linear weld. The pressure transformer, when energized and within limits prescribed by brackets 16, floats without lateral restraint enabling alignment of the electrodes with a consequently uniform application of pressure over the full electrode length.

The pressure transformer also includes an iron core 17, illustrated herein in the form of an E seen most clearly in FIG. 3. The core is a plurality of laminated iron sheets secured to brackets 16. Wound upon the middle leg of core 17 are several primary magnetizing windings 18. The several magnetizing windings are preferably energized independently of the welding circuit or they may be energized by a circuit including the primary winding of the welding transformer 6. The core 17 and its windings are fixed relative to vertically shiftable transformer frame 11, bottom yoke 12, and the attached movable electrode 4. The lower extremity of core 17 normally is spaced from bottom yoke 12 by an air gap of approximately ⅛ inch in the illustrated embodiment.

The several magnetizing windings, as appears in FIG. 5, are separated by insulators 19. The windings 18 may be energized independently of one another and may be connected in various series or parallel combinations to develop a predetermined field strength, as will be familiar to those skilled in this art. A pair of secondary windings 20 fabricated from heavy copper barstock also are wound upon core 17. They each form a separate secondary circuit including copper bars 21 spaced from core 17 and normally extending closely adjacent to the top of pressure transformer frame 11.

The movable electrode is brought into contact with a workpiece placed between the electrodes by means of jack 5. The jack applies an initial 20–25 p.s.i. pressure to the work piece; however, additional electrode pressure during the welding operation itself is supplied by the pressure transformer. This welding pressure is applied in a predetermined time relationship to the welding current.

Upon energizing one or more of the windings 18 on core 17 with D.-C. energy, a magnetic field is developed in the core which induces a high current flow in the secondary windings 20 during the short interval in which the flux is building up to its steady state density. The high current flow through bars 21 in the secondary circuits induces corresponding currents in the adjacent electrically conductive transformer frame.

As is well-known in this art, two adjacent electrical conductors carrying current in opposite directions repel each other with a mechanical force which is proportional to the product of the current flowing in the conductors and inversely to their distance apart. Such a repulsive force is developed by the present invention between the bars 21 of the secondary coils and the top of pressure transformer frame 11. This forces the transformer frame away from the fixed winding and core 17, with a corresponding upward movement of electrode 4 to overcome the inertia of the movable elements and to help develop the forging pressure upon the work piece. It will be apparent that current in secondary windings 21 flows only instantaneously as the D.-C. primary current is initiated. However, prior to decay of the secondary current, the magnetic field developed in core 17 continues the upward motion of the frame 11 by attracting bottom yoke 12 upwardly toward the fixed core. This attractive force is greater than the transient repulsive force developed by the secondary coils 21. It, therefore, sustains and, in fact, supplies most of the welding pressure applied between electrodes 3, 4.

It will be apparent, therefore, that the combination of an inductive secondary winding means on the core, together with electromagnetic means provided by windings 18, develops an electrode welding pressure which commences almost simultaneously with a command signal, to-wit, the D.-C. voltage applied to the magnetic windings 18. The secondary circuits function to overcome the initial inertia of the pressure transformer and electrode structures almost immediately upon command, whereupon the sustaining and larger electrode forging pressure is applied by the electromagnetic components of the pressure transformer.

The time relationship of the repulsive force between the secondary windings and transformer frame and the attractive force between core 17 and bottom yoke is illustrated in FIG. 6. Curve 22 is the D.-C. current supplied to windings 18. Curve 23 represents the repulsive force developed in the pressure transformer as a function of time in relation to the current supplied to the windings 18. Curve 24 represents the magnetic force developed in the transformer as a function of time and in relation to the current input to the magnetizing primary coils. Curve 25 is a composite force curve representing the sum of curves 23 and 24. From a consideration of FIG. 6 it will be apparent that the net effect of the repulsive and attractive forces applied to the transformer frame is a resultant force imparted to welding electrode 4 which is almost simultaneous with the current input to the magnetizing windings, to-wit, the command signal.

The foregoing detailed description has been given for clearness of understanding only, and no unnecessary limitations should be understood therefrom, for certain modifications will be obvious to those skilled in the art. The invention is defined in the following claims:

I claim:

1. A pressure transformer including a magnetic core; at least one primary winding and a secondary winding wound on said core; circuit means completing a secondary circuit including said secondary winding, said means being fixed spatially outside the magnetic field of said core; and a frame movable relative to said core having an electrically conductive portion normally closely adjacent said circuit means and a magnetically permeable portion within the magnetic field of said core and spaced from said core by an air gap.

2. A pressure transformer according to claim 1 wherein the electrically conductive portion of said frame, upon the energizing of said primary winding, is normally movable away from said core and the magnetically permeable portion of said frame is normally movable toward said core.

3. A welding apparatus including a movable electrode; and means for moving said electrode comprising a pressure transformer according to claim 2 wherein said frame is affixed to said movable electrode.

4. A welding apparatus including a fixed electrode; a movable electrode shiftable in parallelism therewith; and means for shifting said movable electrode comprising a pressure transformer according to claim 2 wherein said frame is affixed to said movable electrode.

5. A welding apparatus including a fixed electrode; a movable electrode, shiftable in parallelism therewith; means for shifting said movable electrode comprising a pressure transformer according to claim 2 wherein said frame is affixed to said movable electrode; and support means for securing said fixed electrode and said magnetic core in fixed relation to one another and for guiding the movement of said movable electrode and frame.

6. In a welding apparatus a fixed cylindrical electrode; a movable cylindrical electrode shiftable in parallelism therewith; and pressure transformer means according to claim 2 wherein said frame is affixed to said movable electrode for shifting said movable electrode.

References Cited in the file of this patent

UNITED STATES PATENTS

| | | |
|---|---|---|
| 1,693,135 | Cardwell | Nov. 27, 1928 |
| 2,205,251 | Gillette | June 18, 1940 |
| 2,288,184 | Dodson et al. | June 30, 1942 |
| 2,473,772 | Vang | June 21, 1949 |
| 2,776,362 | Welch | Jan. 1, 1957 |
| 2,785,873 | Holmes et al. | Mar. 19, 1957 |
| 2,892,068 | Park et al. | June 23, 1959 |
| 2,905,804 | Wakely | Sept. 22, 1959 |
| 2,951,189 | Hajny | Aug. 30, 1960 |